US006214148B1

(12) United States Patent
Hill

(10) Patent No.: US 6,214,148 B1
(45) Date of Patent: *Apr. 10, 2001

(54) SYSTEM FOR APPLYING A WOOD VENEER ACROSS A CORNER OF AN ELONGATE CORE

(76) Inventor: David A. Hill, 2613 NW. Robert Way, Bend, OR (US) 97701

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,917

(22) Filed: Nov. 10, 1998

Related U.S. Application Data

(63) Continuation of application No. 08/799,579, filed on Feb. 12, 1997, now abandoned.

(51) Int. Cl.[7] .................................................. B32B 31/00

(52) U.S. Cl. .......................... 156/211; 156/213; 156/247; 156/257; 156/475; 156/580; 156/583.1; 144/270; 144/371; 144/381

(58) Field of Search .................................... 156/211, 213, 156/227, 217, 257, 247, 580, 583.1, 583.8, 443, 475; 144/349, 270, 371, 381; 428/106, 18, 41.8, 535, 537.1

(56) References Cited

U.S. PATENT DOCUMENTS

| | | |
|---|---|---|
| 1,133,106 | 3/1915 | Cuppett . |
| 2,018,712 | 10/1935 | Elmendorf . |
| 2,485,648 | 10/1949 | Norquist . |
| 2,593,863 | 4/1952 | Elmendorf . |
| 2,630,934 | 3/1953 | Elmendorf . |
| 2,693,895 | 11/1954 | Elmendorf . |
| 2,719,808 | 10/1955 | Elmendorf . |
| 3,541,592 | 11/1970 | Lewis . |
| 3,618,646 * | 11/1971 | Lewis ............................... 144/320 X |
| 3,865,681 | 2/1975 | Beebe . |
| 3,943,022 | 3/1976 | Susnjara . |
| 3,964,944 | 6/1976 | Gwynne . |
| 4,035,538 | 7/1977 | Maekawa et al. . |

(List continued on next page.)

FOREIGN PATENT DOCUMENTS

| | | |
|---|---|---|
| 2743-231 | 4/1978 | (DE) . |
| 281956 * | 3/1988 | (EP) .................................... 156/196 |
| 5274 | 3/1889 | (GB) . |
| 6-42170 * | 5/1992 | (JP) . |

OTHER PUBLICATIONS

Advertising and sales literature for Universal 'V' Groover by Auto 'V' Grooving Inc.
Product description flyer for Firestone Airstroke actuators.
Article describing radio frequency gluing technique.
"Gluing and Clamping: A Woodworker's Handbook", Patrick Spielman, p. 182.

*Primary Examiner*—Jeff H. Aftergut
(74) *Attorney, Agent, or Firm*—Kolisch Hartwell Dickinson McCormack & Heuser

(57) ABSTRACT

A method of veneering across a elongate corner on an elongate core involving providing a sheet of veneer sized to cover a desired portion of the core including an expanse on each side of the corner with the veneer having a core side for placement against the core and an exposed side opposite the core side. An elongate groove is formed in the core side of the veneer with the groove having a generally triangular cross-section with an open side substantially coplanar with the core side of the veneer and two interior sides extending into the veneer to a point near but not reaching the exposed side of the veneer where the angle between the interior sides being configured to match the angle of the corner. Lastly the veneer is applied to the core with the groove aligned over the corner and veneer on either side of the groove folded down against the core to thereby bring the two interior sides of the groove together.

10 Claims, 3 Drawing Sheets

U.S. PATENT DOCUMENTS

| | | |
|---|---|---|
| 4,543,284 | 9/1985 | Baum . |
| 4,689,257 | 8/1987 | Baum . |
| 4,853,062 | 8/1989 | Gartland . |
| 4,890,656 | 1/1990 | Ohsumi et al. . |
| 4,931,124 | 6/1990 | Baum . |
| 5,071,688 | 12/1991 | Hoffman . |
| 5,234,519 | 8/1993 | Talbot et al. . |
| 5,439,749 | 8/1995 | Klasell et al. . |

* cited by examiner

SYSTEM FOR APPLYING A WOOD VENEER ACROSS A CORNER OF AN ELONGATE CORE

CROSS-REFERENCE TO RELATED APPLICATION

This application is a continuation of U.S. patent application Ser. No. 08/799,579, filed Feb. 12, 1997, now abandoned.

FIELD OF THE INVENTION

The present invention relates to applying wood veneer to a core, and more particularly to applying a single piece of veneer over a sharp corner on a core.

BACKGROUND

Recent environmental regulations and approaching exhaustion of old-growth timber supplies have made it increasingly difficult and expensive for manufacturers to obtain high-grade lumber to use in their wood products. Such products include furniture, cabinets and millwork. This is particularly a problem for products which are stained rather than painted because the stain does not cover any underlying irregularities in the wood. With painted products, on the other hand, many of the defects in the wood are covered by the finish.

One way of addressing the shortage and high cost of high quality lumber is use of veneered stock. Typically, veneered parts are created by laminating a high quality, i.e., clear, veneer over a lower grade core material, such as medium density fiberboard (MDF), particle board, plywood or finger-jointed stock. Use of veneered parts results in a substantially more efficient utilization of high quality wood, and therefore reduces raw material costs. Unfortunately, the actual process of applying the veneer can be relatively complex.

Veneering is relatively simple if only a single flat surface or two opposed flat surfaces, i.e., one or two sides of a piece of plywood, must be covered. However, covering adjacent sides of a core is substantially more difficult. In particular, multiple processing steps are required to cover adjacent sides. In a first step, the veneer is applied to one of the adjacent sides. The other side of the partially veneered piece must then be surfaced or milled to remove excess glue or overhang of the first applied piece of veneer. After the milling step, the second piece of veneer can be applied. Lastly, the edges of the second piece of veneer must be milled. Thus, applying veneers to two or more adjacent surfaces is a time-consuming and costly process.

Another difficulty incumbent in applying a veneer to two adjacent sides simultaneously is supplying sufficient heat to quickly cure the thermosetting adhesive that is often used for veneering. In particular, at least with thicker veneers, simple conduction heating from heated platens is relatively slow and creates a significant bottleneck in material processing. Radio frequency (RF) heating, on the other hand, heats at a rate that is substantially independent of the thickness of the veneer. Unfortunately, heating two perpendicularly oriented glue lines using RF techniques is difficult because of the preferential heating of glue lines oriented parallel to the electric field. The preferential heating is believed to lead to excess heating of the parallel glue line prior to achieving adequate heating of the perpendicular line.

It is therefore an object of the present invention to provide a system for applying a veneer on two or more adjacent sides of a core in a single step.

It is another object of the present invention to provide a system of veneering that eliminates the need to resurface the core between veneering steps.

One more object of the present invention is to provide a system for veneering that results in a visually attractive corner.

Another object is to provide a system of veneering that is flexible enough to accommodate an edge band with the veneer in a single step.

Yet another object of the present invention is to provide a system for pressing and heating a veneered article.

It is also an object of the present invention to provide a system for pressing and heating a veneered article that can heat orthogonal glue lines in a single step.

SUMMARY OF THE INVENTION

The present invention is a method of veneering across an elongate corner on an elongate core. The method involves providing a sheet of veneer sized to cover a desired portion of the core including an expanse on each side of the corner with the veneer having a core side for placement against the core and an exposed side opposite the core side. An elongate groove is formed in the core side of the veneer with the groove having a generally triangular cross-section with an open side substantially coplanar with the core side of the veneer and two interior sides extending into the veneer to a point near but not reaching the exposed side of the veneer where the angle between the interior sides being configured to match the angle of the corner. Lastly the veneer is applied to the core with the groove aligned over the corner and veneer on either side of the groove folded down against the core to thereby bring the two interior sides of the groove together.

The present invention also includes a press configured to supply pressure to adjacent sides of a press charge simultaneously. The press is also configured to heat adjacent sides of a press charge using radio frequency heating.

DETAILED DESCRIPTION AND BEST MODE OF CARRYING OUT THE INVENTION

Figure 1:
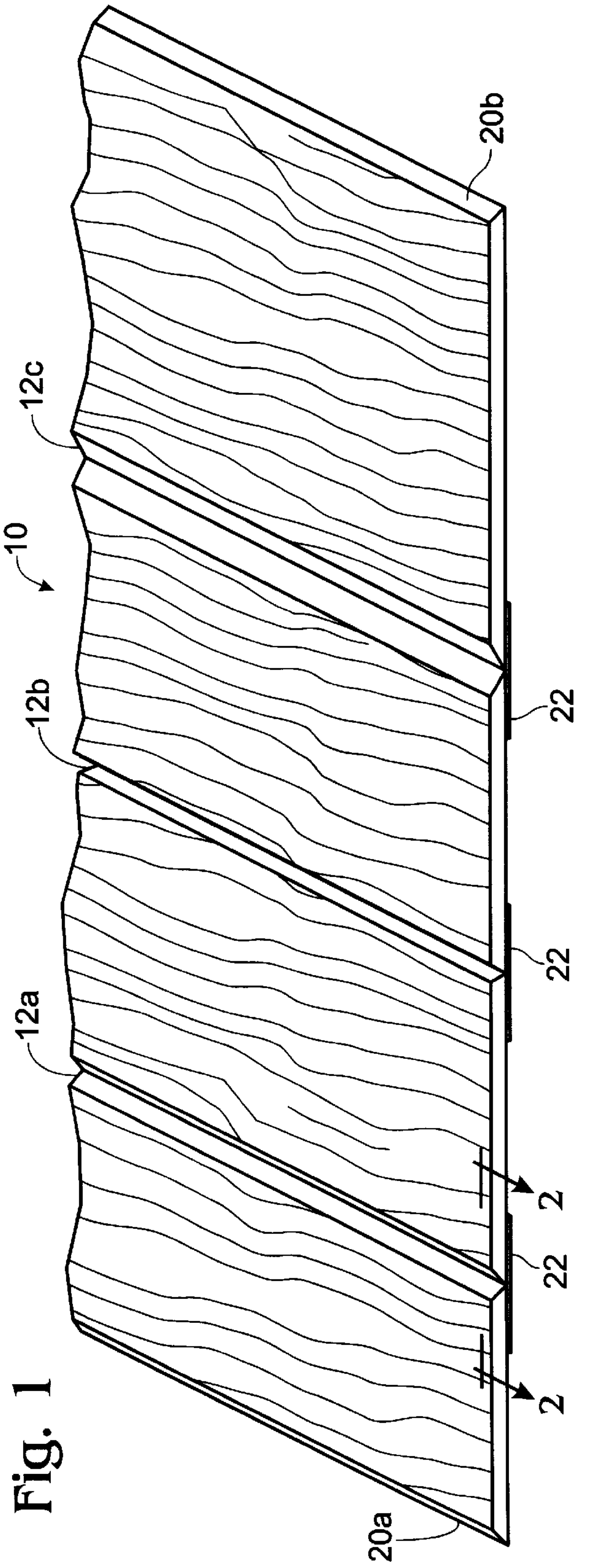
FIG. 1 shows a veneer sheet prepared according to the present invention.
Figure 2:
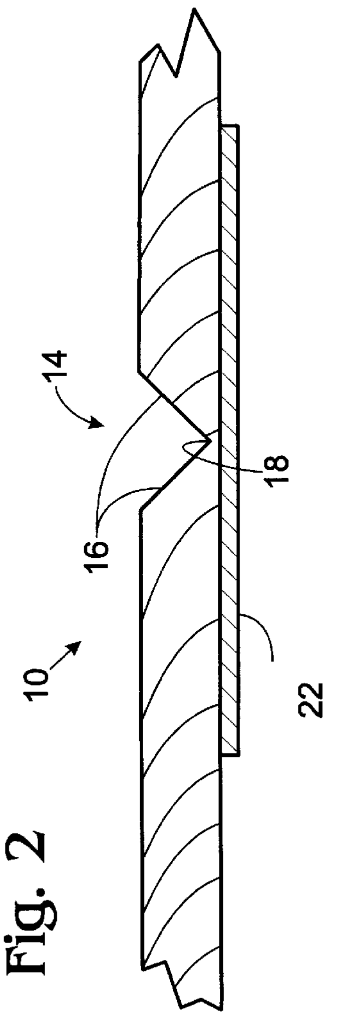
FIG. 2 shows a sectional view through a groove in a veneer sheet prepared according to the present invention.

A sheet of veneer prepared for use according to the present invention is shown generally at 10 in FIG. 1. In an embodiment for covering four sides of a core, sheet 10 includes three longitudinally extending grooves 12*a*–*c*. Each groove is triangular in cross-section with an open side 14 and two interior sides 16 which extend substantially all the way through the veneer to a point 18, as shown in FIG. 2. The angle between the interior sides is determined by the angle through which the veneer must fold when applied. The sheet also includes two beveled lateral edges 20*a*–*b*. The grooves and bevels are preferably formed with a V-grooving machine, such as an Auto 'V' grooving, Inc., AVG-48-HSFWPL universal V-groover, although a table saw can be used as well by tilting the blade 45-degrees.

A hinge structure is formed on the sheet under the point of the groove, as shown in FIG. 2, to aid in preventing cracking or separating when the veneer is folded. In the preferred embodiment, the hinge structure takes the form of a layer of hot melt glue 22, such as Jowatherm EP 613121 Antislip hotmelt glue by Jowat Corporation. The glue may be applied by rolling the sheet over a roller partially submerged in a bath of melted glue. It may be desirable to reinforce the glue by embedding fibers, such as small polyester or glass fibers, in glue across the joint. It should be understood that tape may be used as well, if desired, or paper or fleece could be applied over the hot melt glue to provide extra strength. The hinge structure may also take the form of stitches spanning the groove. The stitches may be formed by a machine known as a stitcher or veneer splicer, which is used to stitch veneer sheets together.

In FIG. 2 it can be seen that, in the preferred embodiment, the groove does not completely sever the veneer, but rather leaves a thin layer of wood at the point of the groove which forms part of the hinge structure. The thin layer of wood is useful because it holds the sheet of veneer together after the grooves are cut if the glue or tape is to be applied at a later time.

Figure 3:
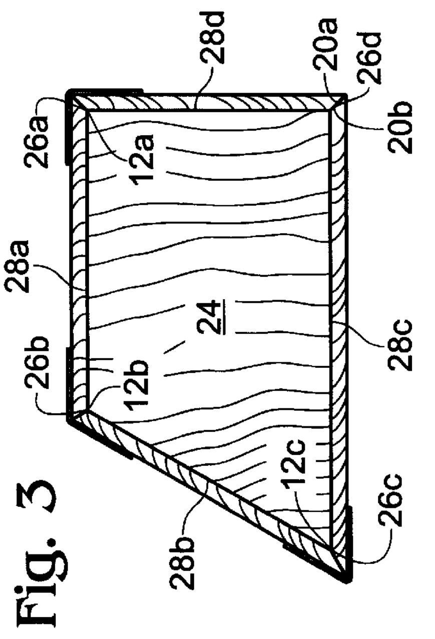
FIG. 3 shows a veneered article according to the present invention.

Sheet 10 is sized and the grooves are spaced for application around a core 24 to form a veneered article, as shown in FIG. 3. Core 24 includes four sharp corners 26*a–d* separating four surface expanses or regions 28*a–d*. It will be understood by those of skill in the art that core 24 is preferably a lower grade product than sheet 10. For instance, core 24 could be formed from MDF, finger-jointed stock or other low cost material while sheet 10 is preferably formed from clear, defect free wood. Most commonly, core 24 will be relatively elongate with the grain of the veneer running parallel to the elongate axis. It is also possible however, to orient the veneer in the opposite direction so that the grooves run across the grain, or in other directions.

As shown in FIG. 3, sheet 10 fits closely about core 24 with the grooves disposed over the sharp corners. The spacing between the grooves is set to correspond to the distance between the sharp corners so that no gaps are left when the veneer is applied. Likewise, the angle between the internal sides of the grooves is chosen to match the angle of the sharp corner over which the groove is to be disposed. For instance, groove 12*a* has a 90-degree angle and fits over a 90-degree sharp corner, i.e., corner 26*a*, on the core. Groove 12*b*, in contrast, has an angle of only 60-degrees because veneer only needs to fold 60-degrees over sharp corner 26*b*. Although the sheet is shown with bevels 20*a–b*, it is also possible to simply butt the edges of the veneer together at sharp edge 26*d*, rather than forming a beveled corner and thereby eliminating the edge bevels.

The veneer is preferably glued onto the core with a thermosetting resin. As will be described below, the resin is heated in a press which supplies both heat and pressure to the veneered article. Because the veneer is relatively thick, conduction heating of the veneer is relatively slow. Therefore, RF heating is used in the preferred embodiment. There are many possibilities for the type of glue, but a polyvinyl acetate (PVA) glue is used in the preferred embodiment because of its suitability for RF heating.

Sheet 10 is preferably approximately 3/32 of an inch thick, which is somewhat thicker than standard veneers, which commonly run 1/32 of an inch. This additional thickness is beneficial in that it permits the veneered article to be milled after application of the veneer to result is a smooth, flat, high-quality surface. With inner veneers, any surfacing after application of the veneer carries with it a substantial risk of cutting through the veneer and exposing the underlying core in places.

It is important to note that part of the function of the hinge structure is to pull the interior sides of the groove together to insure a tightly closed joint and intimate contact between the sides. This is important because, while the thin layer of wood may cover the joint when the veneer is first applied, the subsequent milling or surfacing of the veneer will generally expose the joint. Therefore, the joint should be as tight as possible to maintain the best possible appearance.

In contrast to existing veneering techniques, which typically only apply veneer to one or at most two opposite sides of a core at a time, the present invention involves application of veneer to at least two adjacent sides simultaneously. As a result, existing presses have not been suitable for use with the present invention because they are not designed to supply heat or sufficient pressure simultaneously to two adjacent sides. Of course, it is possible to prepare a veneered article, as shown in FIG. 3, simply using clamps and a standard wood glue. However, a press is preferred because of the higher output attainable through automation.

Figure 4:
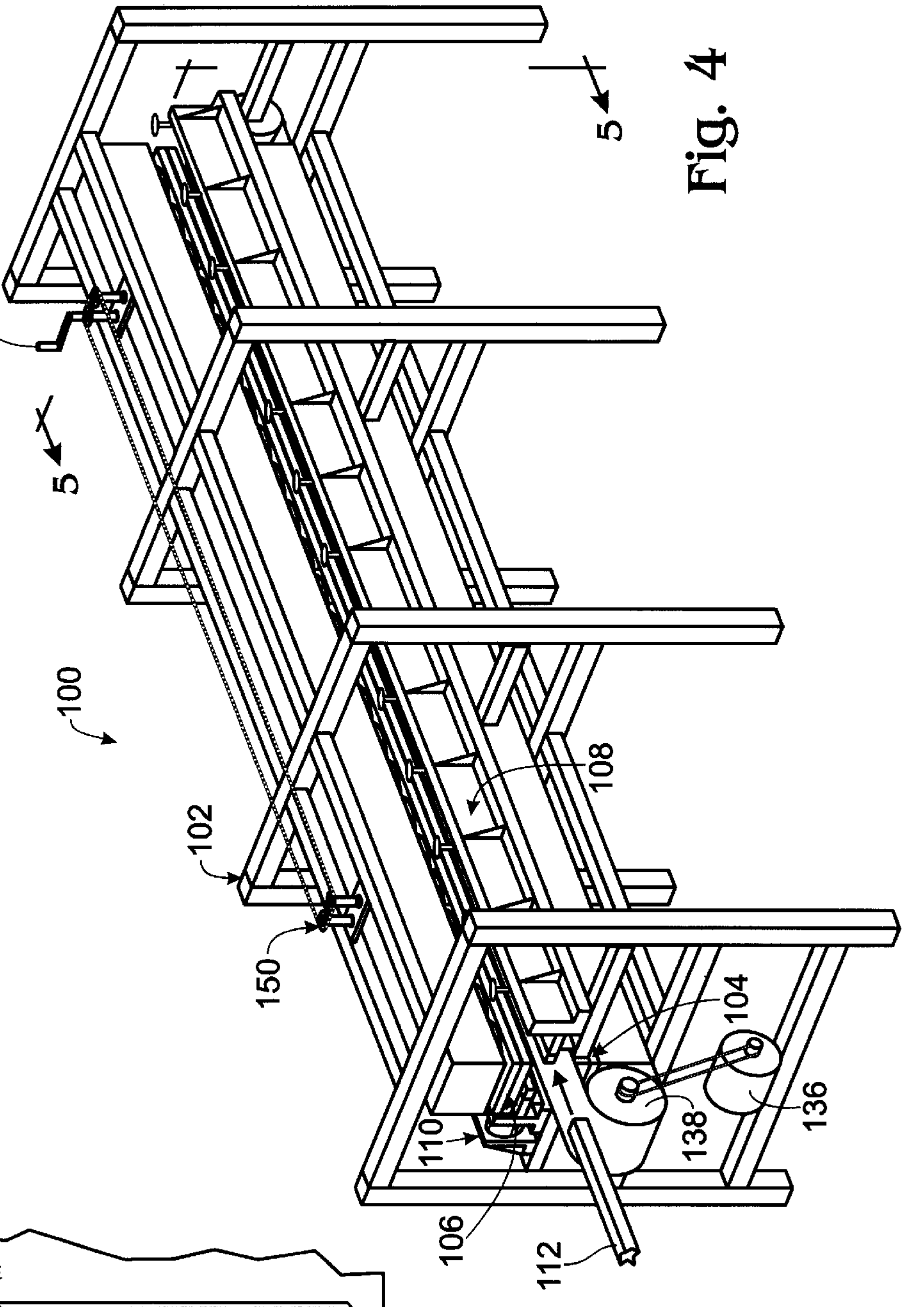
FIG. 4 shows a perspective view of a press constructed according to the present invention.

A press constructed according to the present invention and configured to supply heat and sufficient pressure to adjacent sides of a veneered core is shown at 100 in FIG. 4. Press 100 includes a frame 102 which supports a fixed lower platen assembly 104, a moveable upper platen assembly 106, a fixed side platen assembly 108 and a moveable side platen assembly 110. The platen assemblies are configured to clamp a press charge 112 from the sides and top and bottom simultaneously, as shown in FIG. 5.

Figure 5:
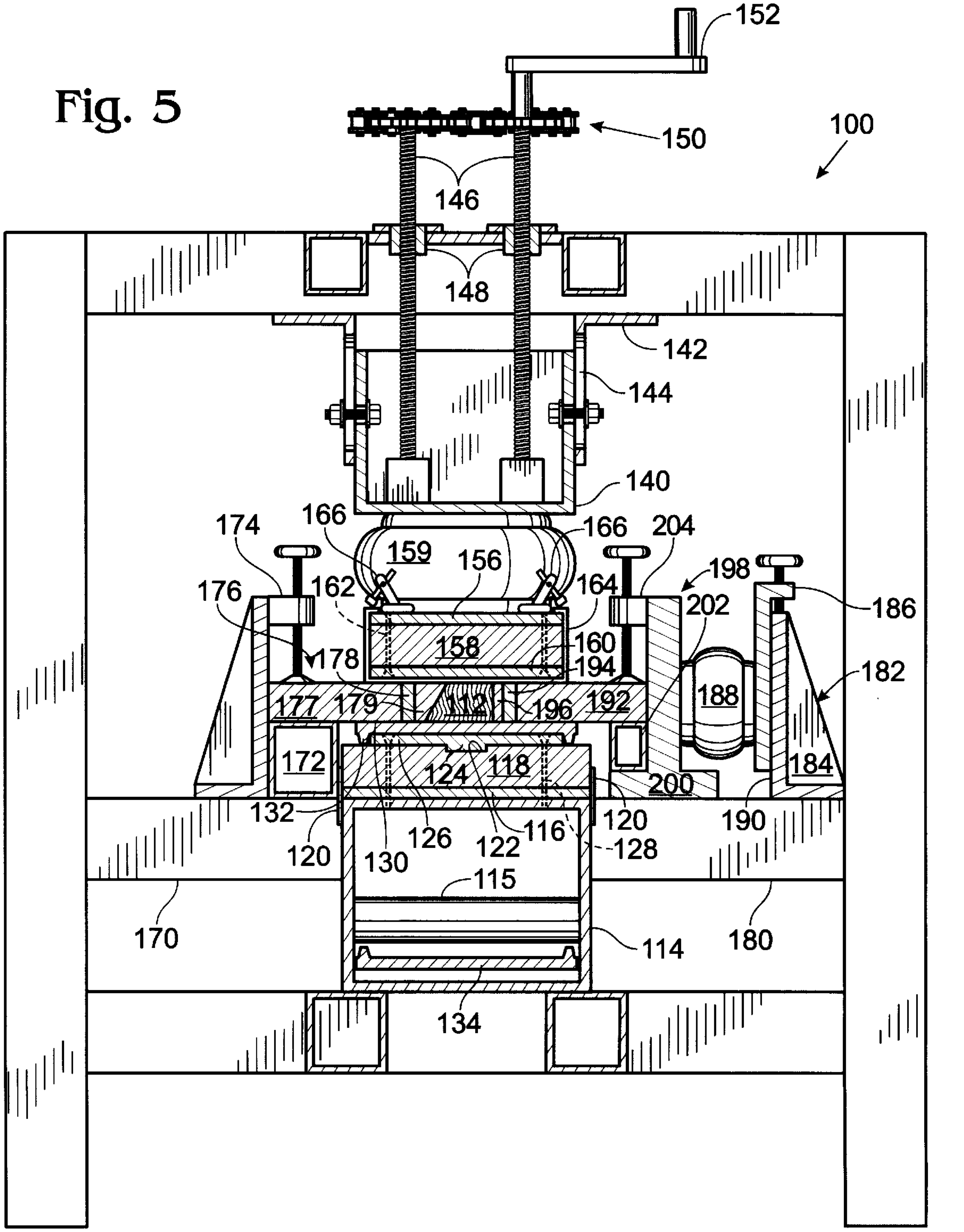
FIG. 5 is a cross-sectional view through the press of FIG. 4 along line 5—5.

As also shown in FIG. 5, lower platen assembly 104 includes an elongate tube-like support frame 114 which runs the length of the frame. The support frame includes strength tubes 115 disposed periodically along its length to increase rigidity. A three-eighths-inch thick steel support plate 116 rests on top of the support frame and carries a thick, ultra-high molecular weight polyethylene (UHMWPE) dielectric layer 118. Steel tabs 120 are placed periodically along the length of the support frame to prevent lateral shifting of the support plate and dielectric layer.

Dielectric layer 118 includes an upper slot 122 configured to receive a key 124 formed on the bottom of a lower electrode 126. The key keeps the electrode from shifting from side-to-side relative to the dielectric layer when the press is operated. The electrode is approximately ½ inch thick, 10 inches wide and is preferably made of aluminum. A pair of flat-head nylon bolts 128 are located every five feet along the length of the platen to further help hold the electrode, dielectric layer, support plate and support frame together. The dielectric layer serves to electrically isolate the electrode.

A conveyor belt 130 fits on top of electrode 126 to convey the press charge. The conveyor belt also electrically insulates the press charge from the electrode. The belt includes a downwardly projecting guide portion 132 at either edge to help guide the belt track over the electrode. The belt includes a return section 134 that passes back through the inside of support frame 114. As shown in FIG. 4, the belt is driven by a motor 136 and rides on end rolls 138 (only one shown) mounted at either end of the support frame.

Upper platen assembly 106 is disposed in opposition over lower platen assembly 104 and includes a support frame 140 which is held in place in frame 102 by a series of angle brackets 142. Each angle bracket includes a vertical slot 144 through which a bolt passes and engages the support frame. The support frame is also connected to frame 102 by four threaded rods 146, each of which passes through a threaded brass insert 148 mounted in frame 102 and is rotatably attached to the support frame. The four rods are tied together by a chain and sprocket system 150 and a crank 152 is attached to one of the rods. By tuning the crank, a user is thereby able to raise and lower the upper platen to accommodate press charges of different thicknesses.

A series of air-powered actuators 154 are attached along the bottom of support frame 140. The actuators are disposed on 12-inch centers and each can produce up to approximately 10,000 pounds of force. Firestone Airstroke® actuators, style 19-.75 are used in the preferred embodiment.

A half-inch aluminum support plate 156 is fixed to the bottom sides of the series of actuators. A thick UHMWPE dielectric layer 158, similar to dielectric layer 118, is disposed beneath the support plate and in turn supports an upper electrode 160. The support plate, dielectric layer and electrode are held together by pairs of flat head nylon bolts 162 disposed every 24 inches along the length of the platen.

A UHMWPE slip sheet 164 fits over and around the support plate, dielectric layer and electrode to provide a replaceable protective cover for the electrode. It is important hat the cover be replaceable because the surface can be damaged from occasional arcing that occurs in the course of RF heating. The slip sheet is preferably formed from a single piece of UHMWPE by machining four elongate grooves, similar to those formed in the veneer sheet The grooves allow the sheet to fold around the support plate, dielectric layer and electrode. The sheet is held in place by toggle clamps 166 located on the upper surface of the support plate between the actuators.

It should be noted that the lower surface of the upper platen assembly can conform somewhat to slight thickness variations in the press charge by virtue of the flexibility of the series of actuators. The lower platen assembly, in contrast, provides a fixed, flat reference for the press charge.

Fixed side platen assembly 108 is carried by a beam 170 to which is mounted a spacer 172 and a clamp 174. The clamp is configured to hold a platen block 176 consisting of a UHMWPE dielectric block 177, a half-inch thick aluminum electrode 178 and a UHMWPE contact sheet 179. The electrode is held in place on the dielectric block by a series of nylon bolts and the contact sheet is held to the electrode by an adhesive tape. Note that the contact sheet is shown formed with a cross-section to match a beveled veneered article, such a shown at 112 and in FIG. 3. This is to illustrate the flexibility of the present invention to accommodate a non-rectangular press charge, but it is anticipated that, most commonly, a flat sheet would be used because most products are Angular in cross-section.

Moveable side platen assembly 108 is carried by a beam 180 to which is mounted an actuator support 182. The actuator support includes a fixed portion 184 which is welded to the beam and a moveable actuator carrier 186 that can be adjusted up and down to maintain a series of actuators 188 mounted thereto in vertical alignment with the press charge. The actuators are generally similar to actuator 154 described above, but are somewhat smaller and referred to as style 16. As with actuators 154, actuators 188 are disposed in an essential continuous edge-to-edge series.

The side platen assembly also includes a platen block 190 which includes a dielectric block 192, a half-inch thick aluminum electrode 194 and a UHMWPE contact sheet 196, constructed in the same fashion as platen block 176. Platen block 190 is carried by a floating block carrier 198 which includes an inverted T-beam 200 which rests on beam 180. A spacer 202 and a clamp 204 are mounted to beam 200 to secure the platen block The side of the beam opposite the platen block is disposed adjacent the actuators to receive pressure therefrom, but the beam is not directly connected to the actuators. This allows the actuators to be adjusted vertically as needed to maintain centering on the press charge, as described above.

The platen blocks are prepared with a height configured to match the height of the desired press charge. Thus, when the upper platen presses down on the press charge, there is just enough room for the platen blocks to slide in between the upper and lower platens to apply pressure to the sides of the press charge.

Although not shown, the electrodes are to be connected to one or two RF generators to supply heat to cure the glue in the press. It is anticipated that the upper and lower platens would be connected to an RF generator as a pair and then the two sides would be connected. It would be possible to either switch a single generator between the upper/lower and side platen pairs or to use a separate RF generator for each platen. It may be preferable to use two generators to overcome the difficulties in adjusting the tuning to account for the different capacitances between the two platen pairs. In either case it is believed that it is preferable to operate the platen pairs in sequence rather than simultaneously to thereby eliminate hot spots that might occur with simultaneous vertical and horizontal glue line heating. It will be understood by those of skill in the art that the upper and lower platens primarily heat the vertically-oriented glue lines when activated and the side platens heat the horizontally-oriented glue lines. It should also be noted that it is anticipated that the inactive pair of platens would be floating relative to ground during the operation of the other pair of platens.

It should be noted that the above-described press is a batch press and the conveyor is simply used to carry products into and out of the press. In the preferred embodiment, the press has a length of approximately 24 feet. This is much longer than required for most individual pieces, but allows for multiple pieces to be placed end-to end. In addition, the press has a pressing cross-section 6 inches high by 10 inches wide. This allows multiple pieces to be stacked side-by-side for simultaneous curing to thereby increase the output of the press.

In operation, an operator will first prepare veneer sheets as desired for application to cores. Glue is applied to the veneer sheets and the operator then wraps the sheets around the cores and feeds unbound article into the press. After filling the press with the desired number of pieces, the press is closed, pressure is applied to the pieces and one opposed set of platens is energized with RF energy to cure any glue lines extending between the energize platens. After the first set of glue lines has been cured, the other set of opposed platens in energized to cure the remaining glue lines. The cure parts are then fed out of the press to be further processed.

Figure 6:
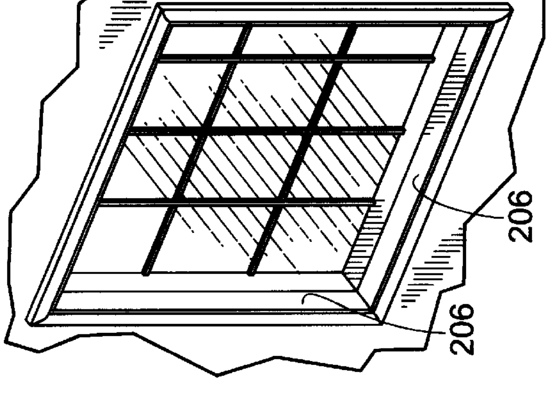
FIG. 6 shows a window utilizing an extension jamb prepared according to the present invention.

As mentioned above, after gluing, the parts are surfaced to provide a high quality final surface. Surfacing will typically remove approximately half of the thickness of veneers such as shown in FIG. 1. Because the veneer starts out rather thick, enough material is left in the layer of veneer so that cutting through the veneer is not a substantial problem. Once surfaced, the veneered articles are ready for incorporation in a final product, such as in an extension jamb 206 for a window, as shown in FIG. 6. Of course, veneered products or articles prepared according to the present invention could be used in many different applications where a high quality wood surface is desired.

Although the present invention has been described with respect to veneering all four sides of a core, in many applications it is only necessary to apply the veneer to two or three sides of a core. In such a case the veneer sheet would be prepared accordingly with only one or two grooves, as necessary. The pressing and finishing operations would remain as previously described. In some cases it may also be desirable to veneer three sides of a core and laminate an edge band onto the fourth side. For instance, it may be desirable to form door stiles in this fashion, with the edge banding providing material in which to mill a molding profile.

One of the benefits of the press constructed according to the present invention is that it can cure glue lines on all four sides of an article in a single pass. This is not limited to the case where veneer is applied to all four sides, but could also be used with the above-described door stile construction. Moreover, in some cases it may be desirable to provide multiple layers of material in certain areas of a product. The described press can process virtually an unlimited variety of core/laminate/veneer/edging combinations.

While the invention has been disclosed in its preferred form, it is to be understood that the specific embodiment thereof as disclosed and illustrated herein is not to be considered in a limited sense and changes or modifications may be made thereto without departing from the spirit of the invention.

I claim:

1. A method of veneering across an elongate corner of an elongate core, the method comprising:

providing an elongate core having a first side and a second side that intersect to form an elongate seamless corner;

providing a sheet of veneer sized to cover a desired portion of the core and the elongate corner, including an expanse of veneer on each side of the corner, the veneer having a core side for placement against the core and an exposed side opposite the core side;

forming an elongate groove in the core side of the veneer, the groove having a generally triangular cross-section with an open side substantially coplanar with the core side of the veneer and two interior sides extending into the veneer to a point near, but not reaching, the exposed side of the veneer, the angle between the interior sides being configured to match the angle of the elongate core;

applying the veneer to the core after forming the elongate groove by aligning the veneer over the portion of th core desired to be covered by the veneer, and by wrapping the veneer over the elongate corner with the groove aligned over the corner and with veneer on either side of the groove folded down against the core to thereby bring the two interior sides of the groove together; and pressing the veneer against the core by applying a first platen member in a direction perpendicular to the first side of the core, and simultaneously pressing a second platen member in a direction perpendicular to the second side of the core.

2. The method of claim 1, further comprising the step of placing a thin flexible backing material on the exposed side of the veneer under the point of the groove.

3. The method of claim 2, further comprising the step of choosing a hot-melt glue for use as the flexible backing material.

4. The method of claim 2, further comprising the step of surfacing the veneer after it is applied to the core to remove the backing material.

5. The method of claim 1, further comprising the step of placing glue in the groove to bond the two interior sides together when the veneer is applied to the core.

6. The method of claim 1, wherein the core includes two spaced-apart sharp corners.

7. A press assembly and composite comprising:

a first moveable platen member and associated first drive mechanism that moves the first moveable platen member in a first direction toward a first fixed platen member, a second moveable platen member and associated second drive mechanism that moves the second platen member in a second direction toward a second fixed platen member, a composite pressed by the platen members, the composite comprising a wood core having two adjacent planar core sides intersecting along a seamless corner, one of the core sides being perpendicular to the first direction and the other core side being perpendicular to the second direction, and a veneer sheet glued to the core, wherein the veneer sheet has a groove aligned with the corner of the core, the groove being substantially closed by bending the veneer around the corner of the core, and wherein the first and second platen members are actuated to press the veneer sheet against the core on both sides of the corner simultaneously.

8. The assembly of claim 7, wherein each of the drive mechanisms includes an air-powered actuator.

9. The assembly of claim 7, wherein the veneer sheet has an internal side applied to the core, an external side, and a hinge member applied to the external side opposite from the groove.

10. The assembly of claim 9, wherein the hinge member comprises hot melt glue.

* * * * *